(12) United States Patent
Han et al.

(10) Patent No.: US 10,690,978 B2
(45) Date of Patent: Jun. 23, 2020

(54) ARRAY SUBSTRATE, DISPLAY PANEL, AND DISPLAY

(71) Applicant: Wuhan China Star Optoelectronics Technology Co., Ltd., Wuhan, Hubei (CN)

(72) Inventors: Yuebai Han, Hubei (CN); Lu Cheng, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/208,514

(22) Filed: Dec. 3, 2018

(65) Prior Publication Data

US 2019/0361305 A1 Nov. 28, 2019

Related U.S. Application Data

(63) Continuation of application No. PCT/CN2018/107591, filed on Sep. 26, 2018.

(30) Foreign Application Priority Data

May 28, 2018 (CN) .......................... 2018 1 0523886

(51) Int. Cl.
*G02F 1/1362* (2006.01)
*G02F 1/1368* (2006.01)
*G09G 3/36* (2006.01)

(52) U.S. Cl.
CPC ...... *G02F 1/136213* (2013.01); *G02F 1/1368* (2013.01); *G02F 1/136286* (2013.01);
(Continued)

(58) Field of Classification Search
CPC ............. G02F 1/136213; G02F 1/1368; G02F 1/136286; G02F 2001/136222;
(Continued)

(56) References Cited

U.S. PATENT DOCUMENTS 5,499,123 A 3/1996 Mikoshiba
2016/0293643 A1 10/2016 Kim et al.
(Continued)

FOREIGN PATENT DOCUMENTS

CN 104536637 A 4/2015
CN 104793401 A 7/2015
(Continued)

OTHER PUBLICATIONS

2nd Office Action of counterpart Chinese Patent Application No. 201810523886.6 dated Oct. 28, 2019.

*Primary Examiner* — Andrew Sasinowski

(57) ABSTRACT

An array substrate, a display panel, and a display are disclosed. At least one metal layer is added to make a contact with a first metal layer of an existing GOA circuit and to partially overlap with a second metal layer and/or poly-silicon layer of the existing GOA circuit in an insulated manner to form a capacitor, which means that at least one capacitor in series connection with existing capacitors is added, so that the capacitance of the GOA circuit is increased while the capacitor area of the GOA circuit is still the area of the existing capacitors, thus, facilitating the narrow-border design of LCDs.

15 Claims, 4 Drawing Sheets

(52) U.S. Cl.
CPC ......... *G09G 3/3655* (2013.01); *G09G 3/3677* (2013.01); *G02F 2001/136222* (2013.01); *G09G 2310/0267* (2013.01); *G09G 2310/0286* (2013.01)

(58) Field of Classification Search
CPC ............... G09G 3/3677; G09G 3/3655; G09G 2310/0286; G09G 2310/0267
See application file for complete search history.

(56) References Cited

U.S. PATENT DOCUMENTS

2016/0358949 A1\* 12/2016 Tian .................... H01L 27/1255
2017/0103720 A1\* 4/2017 Wang ................... G09G 3/3648
2018/0040600 A1   2/2018 Li et al.

FOREIGN PATENT DOCUMENTS

| CN | 204667365 | U | 9/2015 | | |
|----|-----------|---|--------|---|---|
| CN | 104965622 | A | 10/2015 | | |
| CN | 106200167 | A | 12/2016 | | |
| CN | 106526997 | A | 3/2017 | | |
| CN | 107527599 | A | 12/2017 | | |
| CN | 107785399 | A | 3/2018 | | |
| CN | 108020971 |   | \* 5/2018 | ........... | G02F 1/1362 |
| CN | 108020971 | A | 5/2018 | | |

\* cited by examiner

ARRAY SUBSTRATE, DISPLAY PANEL, AND DISPLAY

CROSS REFERENCE TO RELATED APPLICATIONS

The present application is a continuation-application of International (PCT) Patent Application No. PCT/CN2018/107591, filed on Sep. 26, 2018, which claims foreign priority of Chinese Patent Application No. 201810523886.6, filed on May 28, 2018 in the State Intellectual Property Office of China, the entire contents of which are hereby incorporated by reference.

TECHNICAL FIELD

The present disclosure relates to the technical field of displays, in particular to an array substrate, a display panel and a display.

BACKGROUND

GOA (Gate Driver On Array) circuits in display panels such as liquid crystal display panels are generally formed by a plurality of shifting registers. Each shifting register is connected to a scan line. The scan line in each row outputs a high-level signal by charging the capacitor in this shifting register by means of a high-level signal output by the scan line in the prior row, and then resetting is realized by means of a high-level signal output by the scan line in the next row. The capacitance of each capacitor needs to be high enough to make sure that the scan line in each row can output the high-level signal. For this reason, the capacitance of the capacitors of the GOA circuits based on existing designs needs to be further increased.

SUMMARY

In view of this, the present disclosure provides an array substrate, a display panel and a display, which may improve the capacitance of capacitors.

The present disclosure provides an array substrate. A GOA circuit of the array substrate includes a poly-silicon layer, a first insulation layer, a first metal layer, a second insulation layer and a second metal layer which are sequentially disposed in a stacked manner. The poly-silicon layer at least partially overlaps with the first metal layer in an insulated manner to form a capacitor, and the second metal layer at least partially overlaps with the first metal layer to form a capacitor. The GOA circuit further includes at least one metal layer in contact with the first metal layer. The at least one metal layer at least partially overlaps with the second metal layer and/or the poly-silicon layer in an insulated manner to form a capacitor.

The present disclosure further provides a display panel. A GOA circuit of an array substrate of the display panel includes a poly-silicon layer, a first insulation layer, a first metal layer, a second insulation layer and a second metal layer which are sequentially disposed in a stacked manner. The poly-silicon layer at least partially overlaps with the first metal layer in an insulated manner to form a capacitor, and the second metal layer at least partially overlaps with the first metal layer in an insulated manner to form a capacitor. The GOA circuit further includes at least one metal layer in contact with the first metal layer. The at least one metal layer at least partially overlaps with the second metal layer and/or the poly-silicon layer in an insulated manner to form a capacitor.

The present disclosure further provides a display. An array substrate of a display panel of the display is provided with a GOA circuit. The GOA circuit includes a poly-silicon layer, a first insulation layer, a first metal layer, a second insulation layer and a second metal layer which are sequentially disposed in a stacked manner. The poly-silicon layer at least partially overlaps with the first metal layer in an insulated manner to form a capacitor, and the second metal layer at least partially overlaps with the first metal layer in an insulated manner to form a capacitor. The GOA circuit further includes at least one metal layer in contact with the first metal layer. The at least one metal layer at least partially overlaps with the second metal layer and/or the poly-silicon layer in an insulated manner to form a capacitor.

The present disclosure may have the following beneficial effects: at least one metal layer is added to make a contact with the first metal layer of the existing GOA circuit and to at least partially overlap with the second metal layer and/or poly-silicon layer of the existing GOA circuit in an insulated manner, which means that at least one capacitor in series connection with existing capacitors may be added, and thus, the final capacitance of the GOA circuit may be increased.

DETAILED DESCRIPTION

The main objective of the present disclosure is as follows: at least one metal layer is added to make contact with a first metal layer of an existing GOA circuit and to at least partially overlap with a second metal layer and/or poly-silicon layer of the existing GOA circuit in an insulated manner to form a capacitor, which means that at least one capacitor in series connection with the existing capacitors is added based on the existing capacitors, so that the final capacitance of the GOA circuit may be increased, but the capacitor area of the GOA circuit may be still the area of one capacitor, namely, the capacitance may be increased without enlarging the capacitor area, in other words, the capacitor area may be reduced without decreasing the capacitance, thus, facilitating the narrow-border design of LCDs.

A clear and complete description of the technical solutions provided by embodiments of the present disclosure is given below with reference to the accompanying drawings. Without confliction, the embodiments described below and technical characteristics of these embodiments can be combined. In addition, directional terms, such as "upper" and "lower", throughout the whole text are only used to better explain these embodiments, but are not intended to limit the protection scope of the present disclosure.

Figure 1:
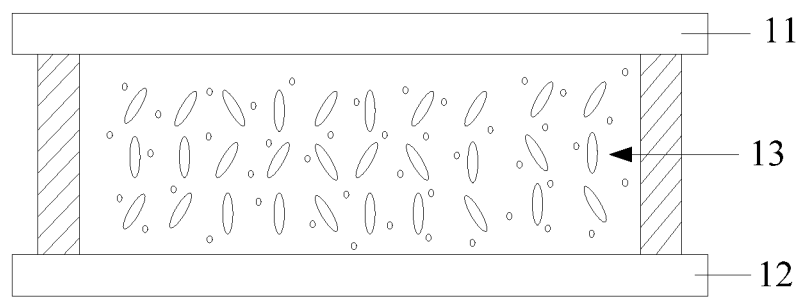
FIG. 1 is a cross-sectional structural view of a display panel in one embodiment of the present disclosure.

FIG. 1 is a cross-sectional structural view of a display panel in the first embodiment of the present disclosure. In this embodiment, the display panel may be a liquid crystal display panel 10; however, the display panel may also be of other types, and the present disclosure has no specific limitation in this regard. As shown in FIG. 1, the liquid crystal display panel 10 may include a color filter substrate (called a CF substrate for short) 11, an array substrate (or a thin film transistor substrate called a TFT substrate for short) 12, and liquid crystals (liquid crystal molecules) 13 filling the space between the two substrates. The liquid crystals 13 are located in a liquid crystal cell formed after the array substrate 12 and the color filter substrate 11 may be stacked together.

Figure 2:
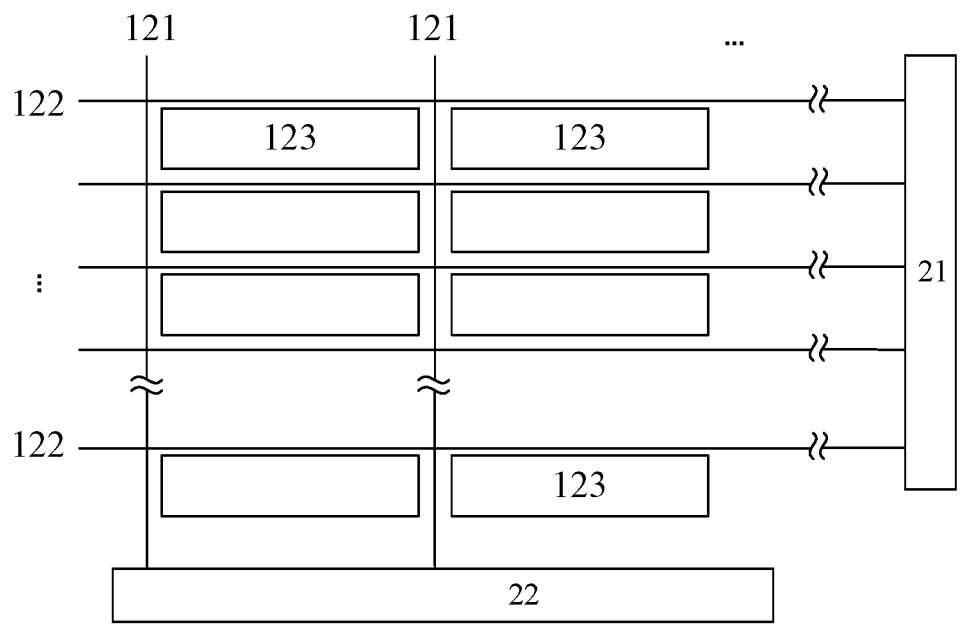
FIG. 2 is a pixel structural view in one embodiment of a liquid crystal display panel in FIG. 1.

Please refer to FIG. 2, which is a pixel structural view of the liquid crystal display panel 10. The array substrate 12 may include a plurality of data lines 121 arrayed in a column direction, a plurality of scan lines 122 arrayed in a row direction and a plurality of pixel regions 123 defined by the scan lines 122 and the data lines 121. Each pixel region 123 may be connected to one corresponding data line 121 and one corresponding scan line 122, the scan lines 122 may be connected to a gate driver 21 to provide a scan voltage for the pixel regions 123, and the data lines 121 may be connected to a source driver 22 to provide a grayscale voltage for the pixel regions 123; and a GOA circuit may be disposed in the gate driver 21.

Figure 3:
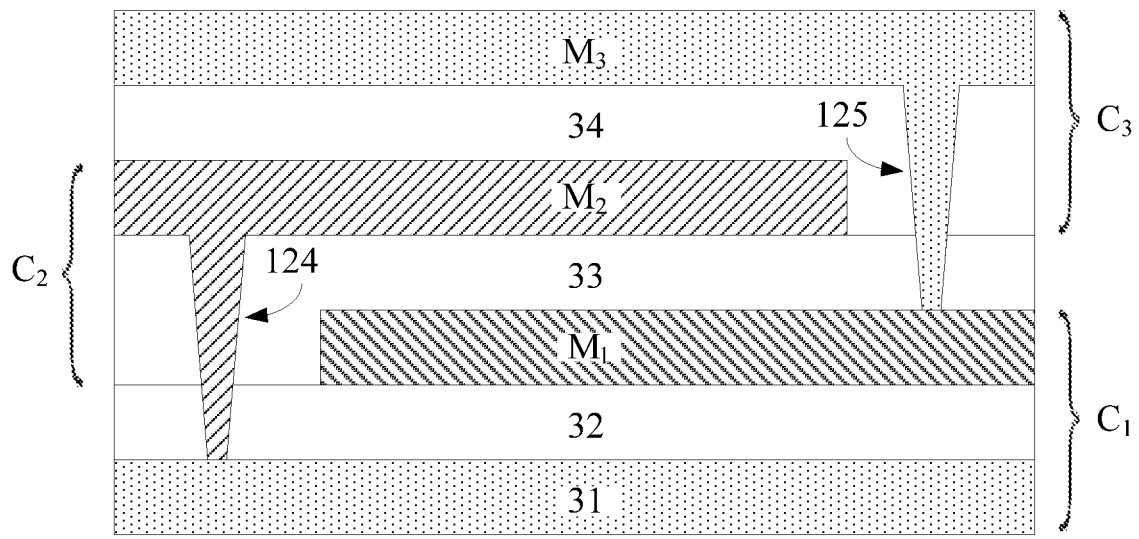
FIG. 3 is a structural view of a GOA circuit in a first embodiment of the present disclosure.

Referring to FIG. 3, the GOA circuit may include a plurality of structural layers sequentially stacked on the array substrate 12, and the structural layers may include a poly-silicon layer 31, a first insulation layer 32, a first metal layer $M_1$, a second insulation layer 33, a second metal layer $M_2$, a third insulation layer 34 and a third metal layer $M_3$. The poly-silicon layer 31 may be synchronously formed with a poly-silicon semiconductor layer of a TFT of the array substrate 12, similarly, the first metal layer $M_1$ may be synchronously formed with a gate electrode of the TFT, the second metal layer $M_2$ may be synchronously formed with a source electrode (or drain electrode) of the TFT, and the third metal layer $M_3$ may be synchronously formed with a common electrode layer or a pixel electrode layer of the array substrate 12. Furthermore, the synchronously-formed structural layers may be made from the same material through the same process.

A first via hole 124 penetrating through the second insulation layer 33 and the first insulation layer 32 and a second via hole 125 penetrating through the third insulation layer 34 and the second insulation layer 33 may be defined on the array substrate 12. The second metal layer $M_2$ may be connected to the first metal layer $M_1$ through the first via hole 124. The third metal layer $M_3$ may be connected to the first metal layer $M_1$ through the second via hole 125.

The first metal layer $M_1$ at least partially may overlap with the poly-silicon layer 31, and overlapping parts of the first metal layer $M_1$ and the poly-silicon layer 31 may be insulated by the first insulation layer 32 clamped between the first metal layer $M_1$ and the poly-silicon layer 31, so that a first capacitor $C_1$ may be formed. The second metal layer $M_2$ at least partially may overlap with the first metal layer $M_1$, and the overlapping parts of the second metal layer $M_2$ and the first metal layer $M_1$ may be insulated by the second insulation layer 33 clamped between the second metal layer $M_2$ and the first metal layer $M_1$, so that a second capacitor $C_2$ may be formed. The third metal layer $M_3$ at least partially may overlap with the second metal layer $M_2$, and the overlapping parts of the third metal layer $M_3$ and the second metal layer $M_2$ may be insulated by the third insulation layer 34 clamped between the third metal layer $M_3$ and the second metal layer $M_2$, so that a third capacitor $C_3$ may be formed. As the second metal layer $M_2$ may make a contact with the poly-silicon layer 31 and the third metal layer $M_3$ may make a contact with the first metal layer $M_1$, the first capacitor $C_1$, the second capacitor $C_2$ and the third capacitor $C_3$ may be sequentially connected in series.

In the area shown in FIG. 3, the final capacitance of the GOA circuit may be the sum of the capacitance of the first capacitor $C_1$, the capacitance of the second capacitor $C_2$ and the capacitance of the third capacitor $C_3$; however, the capacitor area of the GOA circuit may be the area of only one capacitor (original capacitor). Obviously, the present disclosure may increase the capacitance without enlarging the capacitor area, which means that the present disclosure may reduce the capacitor area without decreasing the capacitance, and thus, the narrow-border design of LCDs (Liquid Crystal Displays) may be facilitated.

Figure 4:
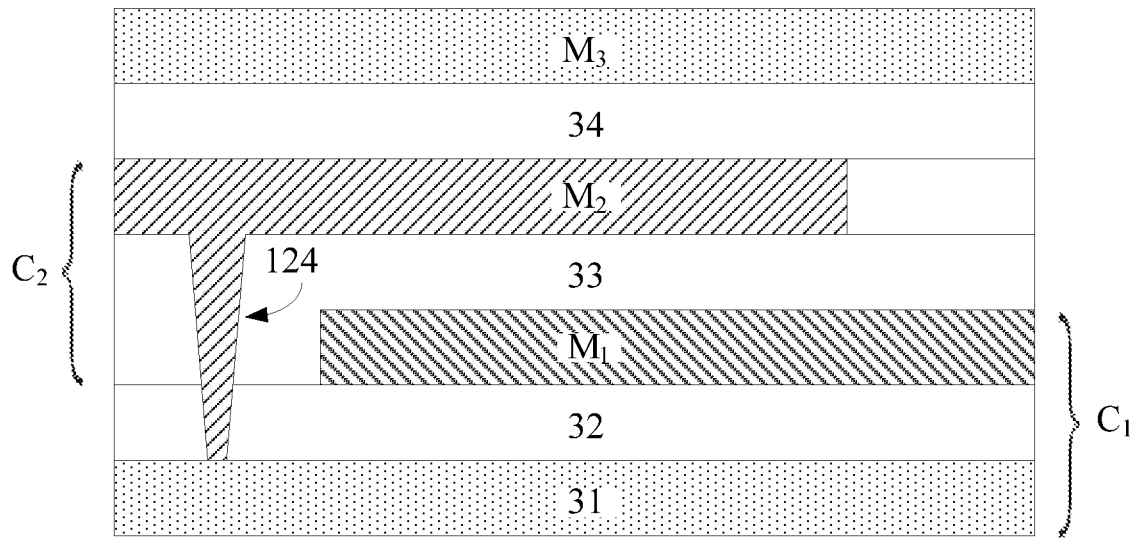
FIG. 4 is a structural view of a GOA circuit in one embodiment of the related art.

As for an array substrate 12, shown in FIG. 3, provided with the four conductive layers (namely the poly-silicon layer 31, the first metal layer $M_1$, the second metal layer $M_2$ and the third metal layer $M_3$) in the related art, the second metal layer $M_2$ makes a contact with the poly-silicon layer 31, as shown in FIG. 4. To facilitate the description, identical reference signals may be used to represent structural elements with identical names in the present disclosure. The third metal layer $M_3$ may not make a contact with the first metal layer $M_1$. Referring to FIG. 3 and FIG. 4 in combination, the GOA circuit in the related art has the same capacitor area with the GOA circuit of the present disclosure, but the GOA circuit in the related art only may include a first capacitor $C_1$ and a second capacitor $C_2$, and thus, the total capacity of the two capacitors may be smaller than the total capacity of the three capacitors in the present disclosure.

Referring to FIG. 3 again, the first insulation layer 32 may be a gate insulation layer (GI) of the TFT, and the second insulation layer 33 may be an interlayer dielectric isolation (ILD) of the TFT. In an application scene where the third metal layer $M_3$ and the pixel electrode layer may be synchronously formed, the common electrode layer may be located between the pixel electrode layer and the source/drain electrode (layer). A passivation layer prepared from, for instance, silicon nitride ($SiN_x$) and having a thickness of 100 nm may be disposed between the common electrode layer and the pixel electrode layer. Thus, the third insulation layer 34 may include a planarization layer (PLN) and the passivation layer of the TFT. Definitely, in order to decrease the thickness of the third insulation layer 34 to further increase the capacity of the third capacitor $C_3$, the planarization layer between the third metal layer $M_3$ and the second metal layer $M_2$ may be etched away, and only the passivation layer may be reserved, in the present disclosure.

Figure 5:
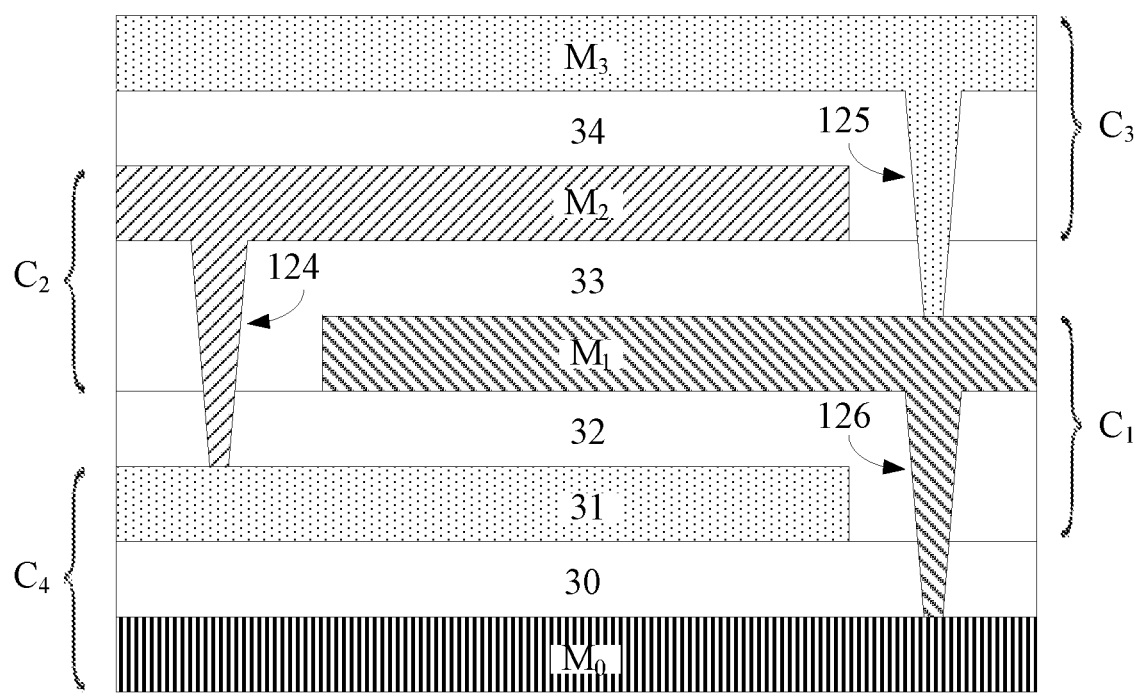
FIG. 5 is a structural view of a GOA circuit in a second embodiment of the present disclosure.

FIG. 5 is a structural view of the second embodiment of the GOA circuit in the present disclosure. In the present disclosure, identical reference signals may be used to represent structural elements with identical names. Based on the description of the above embodiment, the GOA circuit in this embodiment further may include a fourth insulation layer 30 and a fourth metal layer $M_0$, that is to say, the GOA circuit in this embodiment may include five conductive layers, namely the poly-silicon layer 31, the first metal layer $M_1$, the second metal layer $M_2$, the third metal layer $M_3$ and the fourth metal layer $M_0$. The fourth metal layer $M_0$ may be located under the poly-silicon layer 31, and the fourth insulation layer 30 may be located between the fourth metal layer $M_0$ and the poly-silicon layer 31. The fourth metal layer $M_0$ may be synchronously formed with a light shield (LS) of the array substrate 12, and the light shield may be located under the poly-silicon semiconductor layer in the TFT and is used to prevent light leakage.

In addition, a third via hole 126 penetrating through the first insulation layer 32 and the fourth insulation layer 30 may be defined on the array substrate 12. The first metal layer $M_1$ may be connected to the fourth metal layer $M_0$ through the third via hole 126. The poly-silicon layer 31 at least partially may overlap with the fourth metal layer $M_0$, and the overlapping parts of the poly-silicon layer 31 and the fourth metal layer $M_0$ may be insulated by the fourth insulation layer 30 located between the poly-silicon layer 31 and the fourth metal layer $M_0$, so that a fourth capacitor $C_4$ may be formed. As the first metal layer $M_1$ may make a contact with the fourth metal layer $M_0$, the fourth capacitor $C_4$, the first capacitor $C_1$, the second capacitor $C_2$ and the third capacitor $C_3$ may be sequentially connected in series.

In the area shown in FIG. 5, the final capacitance of the GOA circuit may be the sum of the capacitance of the first capacitor $C_1$, the capacitance of the second capacitor $C_2$, the capacitance of the third capacitor $C_3$ and the capacitance of the fourth capacitor $C_4$, but the capacitor area of the GOA circuit is the area of only one capacitor. Obviously, this embodiment may also increase the capacitance without enlarging the capacitor area, which means that this embodiment may also reduce the capacitor area without decreasing the capacitance, and thus, the narrow-border design of LCDs may be facilitated.

Figure 6:
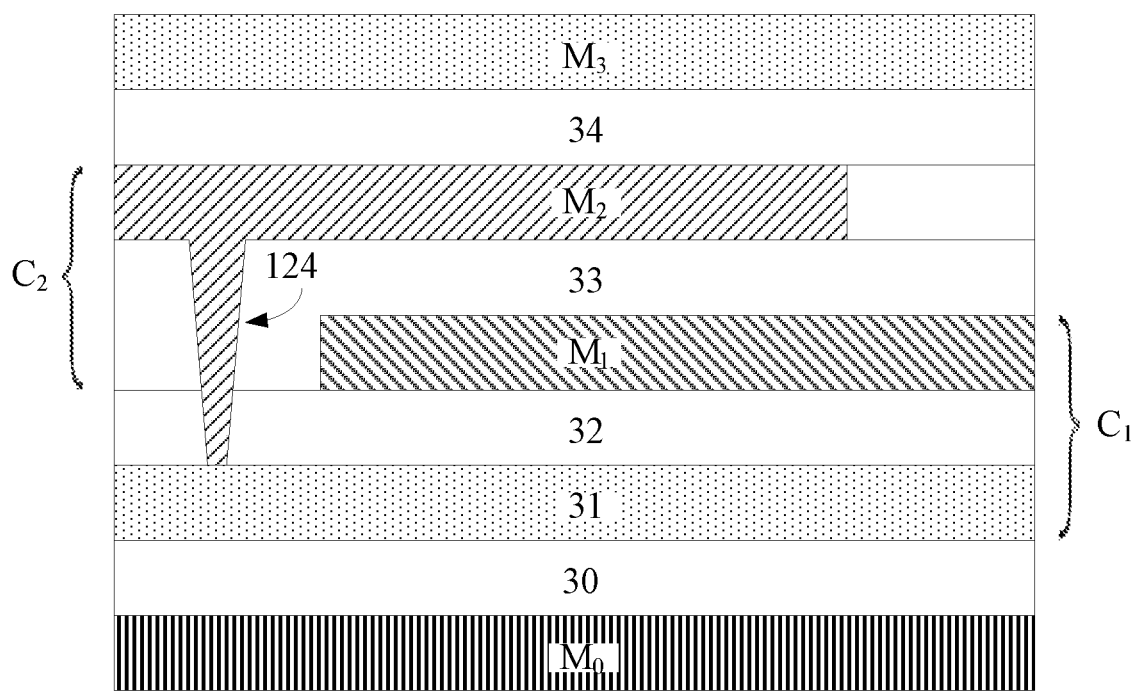
FIG. 6 is a structural view of a GOA circuit in another embodiment of the related art.

As for an array substrate 12, shown in FIG. 5, provided with the five conductive layers (namely the fourth metal layer $M_0$, the poly-silicon layer 31, the first metal layer $M_1$, the second metal layer $M_2$ and the third metal layer $M_3$) in the related art, only the second metal layer $M_2$ makes a contact with the poly-silicon layer 31, as shown in FIG. 6. To facilitate the description, identical reference signs may be used to represent structural elements with identical names in the present disclosure. The third metal layer $M_3$ may not make a contact with the first metal layer $M_1$, and the poly-silicon layer 31 may not make a contact with the fourth metal layer $M_0$ either. Referring to FIG. 5 and FIG. 6 in combination, the GOA circuit in the related art has the same capacitor area with the GOA circuit of the present disclosure, but the GOA circuit in the related art only includes a first capacitor $C_1$ and a second capacitor $C_2$, and thus, the total capacity of the two capacitors may be smaller than the total capacity of the four capacitors in the present disclosure.

It should be understood that based on the aforesaid main objective, the GOA circuit in the present disclosure may also be provided with the fourth metal layer $M_0$, but may not be provided with the third metal layer $M_3$. In this case, the final capacitance of the GOA circuit may be the sum of the capacitance of the first capacitor $C_1$, the capacitance of the second capacitor $C_2$ and the capacitance of the fourth capacitor $C_4$, but the capacitor area of the GOA circuit may be the area of the only original capacitor, so that this embodiment may also increase the capacitance without enlarging the capacitor area, which means that this embodiment may also reduce the capacitor area without decreasing the capacitance, and thus, the narrow-border design of LCDs may be facilitated.

Figure 7:
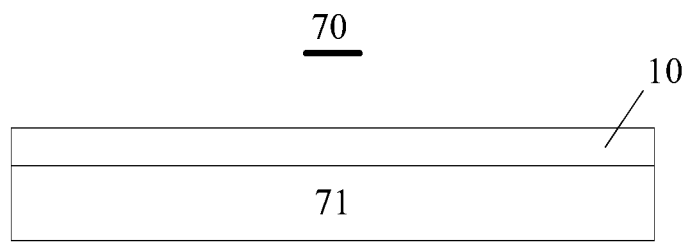
FIG. 7 is a cross-sectional structural view of a display in one embodiment of the present disclosure.

The present disclosure further provides a display shown in FIG. 7. In this embodiment, the display may be a liquid crystal display 70. Definitely, the display may also be of other types, and the present disclosure has no specific limitation in this regard. The liquid crystal display 70 may include the liquid crystal display panel 10 mentioned above and a backlight module 71 used to provide light for the liquid crystal display panel 10. The liquid crystal display 70 may adopt the array substrate 12 designed in the aforesaid manner, thereby having identical beneficial effects.

It should be understood that the above description is only used to explain certain embodiments of the present disclosure, but is not intended to limit the patent scope of the present disclosure. All equivalent structures or equivalent flow transformations based on the contents in the specification and accompanying drawings such as combinations of technical characteristics of embodiments, or direct or indirect applications to other relevant technical fields should also fall within the patent protection scope of the present disclosure.

What is claimed is:

1. An array substrate comprising a GOA circuit, wherein the GOA circuit of the array substrate comprises a poly-silicon layer, a first insulation layer, a first metal layer, a second insulation layer and a second metal layer which are sequentially disposed in a stacked manner, wherein the poly-silicon layer at least partially overlaps with the first metal layer in an insulated manner to form a capacitor, and the second metal layer at least partially overlaps with the first metal layer in an insulated manner to form a capacitor; and the GOA circuit further comprises at least one metal layer in contact with the first metal layer, and the at least one metal layer at least partially overlaps with the second metal layer and/or the poly-silicon layer in an insulated manner to form a capacitor;

wherein the at least one metal layer comprises a third metal layer, and the third metal layer is synchronously formed with a common electrode layer or a pixel electrode layer of the array substrate;

wherein the third metal layer is synchronously formed with the pixel electrode layer and overlaps with the second metal layer in an insulation manner through a third insulation layer; the third insulation layer comprises a passivation layer and a planarization layer of the array substrate; the passivation layer is located between the common electrode layer and the pixel electrode layer, and the planarization layer is located between the common electrode layer and the third metal layer.

2. The array substrate according to claim 1, wherein the third metal layer is synchronously formed with the pixel electrode layer and overlaps with the second metal layer in an insulated manner through a third insulation layer; the third insulation layer is a passivation layer of the array substrate, and the passivation layer is located between the common electrode layer and the pixel electrode layer.

3. The array substrate according to claim 2, a via hole penetrating through the third insulation layer and the second insulation layer is defined on the array substrate, and the third metal layer is connected to the first metal layer through the via hole.

4. The array substrate according to claim 1, wherein the at least one metal layer comprises a fourth metal layer located below the poly-silicon layer in a stacked manner and is synchronously formed with a light shield of the array substrate, and the light shield is located under a poly-silicon semiconductor layer of the array substrate.

5. The array substrate according to claim 4, wherein the fourth metal layer overlaps with the poly-silicon layer in an insulated manner through a fourth insulation layer; the fourth insulation layer is a buffer layer of the array substrate, and the buffer layer is located between the light shield and a poly-silicon semiconductor layer of the array substrate.

6. The array substrate according to claim 5, wherein a via hole penetrating through the first insulation layer and the fourth insulation layer is defined on the array substrate, and the first metal layer is connected to the fourth metal layer through the via hole.

7. A display panel comprising an array substrate; and the array substrate comprising a GOA circuit, wherein the GOA circuit of the array substrate comprises a poly-silicon layer, a first insulation layer, a first metal layer, a second insulation layer and a second metal layer which are sequentially disposed in a stacked manner, wherein the poly-silicon layer at least partially overlaps with the first metal layer to form a capacitor, and the second metal layer at least partially overlaps with the first metal layer in an insulated manner to form a capacitor; and the GOA circuit further comprises at least one metal layer in contact with the first metal layer, and the at least one metal layer at least partially overlaps with the second metal layer and/or the poly-silicon layer in an insulated manner to form a capacitor;
wherein the at least one metal layer comprises a third metal layer, and third metal layer is synchronously formed with a common electrode layer or a pixel electrode layer of the array substrate;
wherein the third metal layer is synchronously formed with the pixel electrode layer and overlaps with the second metal layer in an insulated manner through a third insulation layer; the third insulation layer comprises a passivation layer and a planarization layer of the array substrate; the passivation layer is located between the common electrode layer and the pixel electrode layer, and the planarization layer is located between the common electrode layer and the third metal layer.

8. The display panel according to claim 7, wherein the third metal layer is synchronously formed with the pixel electrode layer and overlaps with the second metal layer in an insulated manner through a third insulation layer; the third insulation layer is a passivation layer of the array substrate, and the passivation layer is located between the common electrode layer and the pixel electrode layer.

9. The display panel according to claim 8, wherein a via hole penetrating through the third insulation layer and the second insulation layer is defined on the array substrate, and the third metal layer is connected to the first metal layer through the via hole.

10. The display panel according to claim 7, wherein the at least one metal layer comprises a fourth metal layer located below the poly-silicon layer in a stacked manner; the fourth metal layer is synchronously formed with a light shield of the array substrate, and the light shield is located under a poly-silicon semiconductor layer of the array substrate.

11. The display panel according to claim 10, wherein the fourth metal layer overlaps with the poly-silicon layer in an insulated manner through a fourth insulation layer; the fourth insulation layer is a buffer layer of the array substrate, and the buffer layer is located between the light shield and a poly-silicon semiconductor layer of the array substrate.

12. The display panel according to claim 11, wherein a via hole penetrating through the first insulation layer and the fourth insulation layer is defined on the array substrate, and the first metal layer is connected to the fourth metal layer through the via hole.

13. A display comprising a display panel; the display panel comprising an array substrate; and the array substrate of the display panel comprising a GOA circuit, wherein the GOA circuit comprises a poly-silicon layer, a first insulation layer, a first metal layer, a second insulation layer and a second metal layer which are sequentially disposed in a stacked manner; the poly-silicon layer at least partially overlaps with the first metal layer in an insulated manner to form a capacitor, and the second metal layer at least partially overlaps with the first metal layer in an insulated manner to form a capacitor; and the GOA circuit further comprises at least one metal layer in contact with the first metal layer, and the at least one metal layer partially overlaps with the second metal layer and/or the poly-silicon layer an in insulated manner to form a capacitor;
wherein the at least one metal layer comprises a third metal layer, and the third metal layer is synchronously formed with a common electrode layer or a pixel electrode layer of the array substrate;
wherein the third metal layer is synchronously formed with the pixel electrode layer and overlaps with the second metal layer in an insulation manner through a third insulation layer; the third insulation layer comprises a passivation layer and a planarization layer of the array substrate; the passivation layer is located between the common electrode layer and the pixel electrode layer, and the planarization layer is located between the common electrode layer and the third metal layer.

14. The display according to claim 13, wherein the third metal layer is synchronously formed with the pixel electrode layer and overlaps with the second metal layer in an insulated manner through a third insulation layer; the third insulation layer is a passivation layer of the array substrate, and the passivation layer is located between the common electrode layer and the pixel electrode layer.

15. The display according to claim 13, wherein the at least one metal layer comprises a fourth metal layer located below the poly-silicon layer in a stacked manner, the fourth metal layer is synchronously formed with a light shield of the array substrate, and the light shield is located under a poly-silicon semiconductor layer of the array substrate.

* * * * *